(12) United States Patent
Tzou et al.

(10) Patent No.: US 11,337,274 B2
(45) Date of Patent: May 17, 2022

(54) METHOD, APPARATUS AND DEVICE FOR CONTROLLING DUAL-MODE COMMUNICATION, AND COMPUTER READABLE STORAGE MEDIUM

(71) Applicant: HANGZHOU VANGO TECHNOLOGIES, INC., Zhejiang (CN)

(72) Inventors: Ching-Kae Tzou, Zhejiang (CN); Yuanfu Chen, Zhejiang (CN)

(73) Assignee: HANGZHOU VANGO TECHNOLOGIES, INC., Zhejiang (CN)

( * ) Notice: Subject to any disclaimer, the term of this patent is extended or adjusted under 35 U.S.C. 154(b) by 130 days.

(21) Appl. No.: 17/013,536

(22) Filed: Sep. 5, 2020

(65) Prior Publication Data

US 2021/0400766 A1 Dec. 23, 2021

(30) Foreign Application Priority Data

Jun. 22, 2020 (CN) .......................... 202010574353.8

(51) Int. Cl.
*H04W 88/06* (2009.01)
*H04W 28/02* (2009.01)
*H04B 3/54* (2006.01)

(52) U.S. Cl.
CPC ............ *H04W 88/06* (2013.01); *H04B 3/542* (2013.01); *H04W 28/0236* (2013.01); *H04W 28/0268* (2013.01)

(58) Field of Classification Search
CPC .......... H04B 3/54–56; H04W 28/0236; H04W 28/0268; H04W 88/06
See application file for complete search history.

(56) References Cited

U.S. PATENT DOCUMENTS

| 2012/0106441 | A1* | 5/2012 | Juneja | ..................... H04L 69/14 |
| | | | | 370/328 |
| 2013/0083782 | A1 | 4/2013 | Murphy et al. | |
| 2018/0124676 | A1* | 5/2018 | Zeng | ..................... H04W 36/08 |

FOREIGN PATENT DOCUMENTS

| CN | 103036809 A | 4/2013 |
| CN | 103929377 A | 7/2014 |
| CN | 109067654 A | 12/2018 |
| CN | 109347521 A | 2/2019 |

(Continued)

OTHER PUBLICATIONS

First Office Action dated Nov. 4, 2020 for Chinese priority Application No. 202010574353.8, English translation provided by Global Dossier.

*Primary Examiner* — Ronald Eisner
(74) *Attorney, Agent, or Firm* — Yue (Robert) Xu; Apex Attorneys at Law, LLP

(57) ABSTRACT

Provided are method, apparatus and device for controlling dual-mode communication, and non-transitory computer readable storage medium. The method applied to a first communication node includes: establishing a communication connection with at least one target communication node in a target communication network through a wired communication protocol, to obtain a wired communication data packet; extracting wireless communication configuration information pre-stored in the wired communication data packet; and configuring a wireless communication port based on the wireless communication configuration information.

10 Claims, 5 Drawing Sheets

(56) References Cited

FOREIGN PATENT DOCUMENTS

| | | |
|---|---|---|
| CN | 109660958 A | 4/2019 |
| CN | 110930676 A | 3/2020 |
| EP | 2341689 A1 | 7/2011 |

* cited by examiner

| Bits: 0–2 | 3 | 4 | 5 | 6 | 7 | 8-9 | 10-11 | 12-13 | 14-15 |
|---|---|---|---|---|---|---|---|---|---|
| Frame Type | Security Enabled | Frame Pending | Ack. Request | PAN ID Compression | Radio Enabled | Reserved | Dest. Addressing Mode | Frame Version | Source Addressing Mode |
| Frame Control | | | | | | | | | |

| Size (in Bytes): 3 | 2 | 1 | 0/2 | 0/2/8 | 0/2 | 0/2/8 | 0/6 | 0/2 |
|---|---|---|---|---|---|---|---|---|
| Segment control | Frame control | Sequence number | Destination PAN | Destination address | Source PAN | Source address | Auxiliary security header | Radio Channel select & Data Rate |
| MHR | | | | | | | | |

METHOD, APPARATUS AND DEVICE FOR CONTROLLING DUAL-MODE COMMUNICATION, AND COMPUTER READABLE STORAGE MEDIUM

This application claims the priority to Chinese Patent Application No. 202010574353.8, titled "METHOD, APPARATUS AND DEVICE FOR CONTROLLING DUAL-MODE COMMUNICATION, AND STORAGE MEDIUM", filed on Jun. 22, 2020 with the China National Intellectual Property Administration (CNIPA), the content of which is incorporated herein by reference.

TECHNICAL FIELD

The present disclosure relates to the technical field of communications, and in particular to a method, apparatus and device for controlling dual-mode communication, and a computer readable storage medium.

BACKGROUND

In a dual-mode communication network, multiple communication nodes may form a network through wired communication, and the multiple communication nodes may also form a network through wireless communication. The combination of wired communication and wireless communication improves communication reliability and provides more options for communication modes, thus helping the communication nodes in the network choose a more reasonable communication transmission path with a lower communication cost.

Dual-mode communication is often used in a smart grid. The smart grid usually includes real-time or near real-time sensors and functions of remote power quality monitoring, remote meter reading and remote meter control. When necessary, a station or a meter in the smart grid is required to provide the function of active power failure reporting or emergency information transmission. These additional functions are unnecessary to a meter for simple automatic meter reading (AMR), but are provided in meters used in many automatic metering infrastructures (AMIs). Different from the meter for AMR, the meter used in the advanced AMI generally has the capability of performing a two-way communication with a central system.

In a network formed by meters and a central system, the connection between the meters and the central system may be a fixed wired connection, such as a power line connection. In a power line network or a smart grid, a basic local area network typically includes a central coordinator (CCO) or a data concentrator (DC) which serves as a base station, a data collect unit (DCU) or a proxy coordinator (PCO) which is managed by the base station, and multiple terminal stations (STAs) i.e., meters or terminal devices.

In a network formed by meters and a central coordinator (or a data concentrator), the connection between the meters and the central coordinator (or the data concentrator) may be through wireless communication. For a local area network based on wireless communication in the smart grid, a process from initial forming the local area network to completing constructing the local area network may include the following steps 1 to 3.

In step 1, the central coordinator (or the data concentrator), that is, the base station in the local area network, transmits a pilot beacon or a pilot signal on a selected wireless channel. The pilot beacon is usually a short packet which is periodically transmitted in a certain format and carrying a small amount of information.

In step 2, a terminal station which is newly added to the local area network will monitor and receive the pilot beacon on a selected communication channel, and respond once successfully receiving the beacon signal. When the terminal station responds, a carrier sense multiple access with collision avoidance (CSMA/CA) mechanism is usually applied so as to reduce conflict with response signals from nearby terminal stations.

In step 3, the central coordinator (or the data concentrator) completes the handshake protocol with the terminal station. The terminal station configures a communication port with a wireless channel designated by the data concentrator and a rate selected by the data concentrator. After a new meter access registration program is performed and the wireless communication port is configured, the terminal station can transmit and receive data packets in a wireless way within the local area network which is managed by the central coordinator (or the data concentrator).

In a dual-mode communication network, a terminal station supporting dual-mode communication completes the wired communication configuration and the wireless communication configuration in the above way. However, it takes too much time for the wireless terminal station to complete an access registration in this way. If there are many channels available, it will take a long time for the wireless terminal station to scan the pilot channel, perform synchronization with the base station, and then perform the handshake protocol to complete channel configuration. More seriously, if the network under the management of the central coordinator (or the data concentrator) includes a large number of wireless terminal stations, all the wireless terminal stations are required to scan the pilot channel and perform the handshake protocol to complete channel configuration, and then the time required for the construction of the local area network will increase exponentially. Moreover, if some of the wireless terminal stations in the network under the management of the central coordinator (or the data concentrator) communicate with each other in a poor quality or even cannot communicate with each other, and can only communicate with each other with the assistance of other adjacent wireless terminal stations, the process of configuring the wireless communication port will become more complicated and time-consuming.

The technical problem to be solved by those skilled in the art is how to provide a more time-saving method for controlling dual-mode communication.

SUMMARY

The present disclosure aims to provide a method, apparatus and device for controlling dual-mode communication, and a computer readable storage medium. Compared with the conventional technology, the technical solution provided by the present disclosure is able to realize wireless communication configuration in dual-mode communication more quickly, thereby accelerating the access registration process of the wireless communication nodes in dual-mode communication.

To solve the above technical problems, a method for controlling dual-mode communication is provided in the present disclosure, in which the method is applied to a first communication node. The method includes:

establishing a communication connection with at least one target communication node in a target communication network by a wired communication protocol, to obtain a wired communication data packet;

extracting wireless communication configuration information pre-stored in the wired communication data packet; and configuring a wireless communication port based on the wireless communication configuration information.

In an embodiment, the wireless communication configuration information include:

a wireless communication channel and a wireless communication rate used in the target communication network.

In an embodiment, the wired communication protocol is a power line carrier communication protocol, the wired communication data packet is a power line carrier communication data packet, and the wireless communication configuration information is stored in a media access control header of the power line carrier communication data packet.

In an embodiment, before the extracting wireless communication configuration information pre-stored in the wired communication data packet, the method further includes:

determining whether a wireless communication function bit in the wired communication data packet is defined as supporting wireless communication; and proceeding to the step of extracting the wireless communication configuration information pre-stored in the wired communication data packet, in response to a positive determination.

In an embodiment, the method further includes:

after receiving a route request message sent by a sending node, evaluating, based on a preset rule, a difference between a communication cost of a wired communication transmission path between the first communication node and the sending node and a communication cost of a wireless communication transmission path between the first communication node and the sending node, to obtain an evaluation result on communication cost difference; and updating and forwarding communication cost information about communication with the sending node based on the evaluation result of communication cost difference, so that a destination node of the sending node selects a communication transmission path with a lowest communication cost based on the evaluation result on communication cost difference.

In an embodiment, the evaluating, based on a preset rule, a difference between a communication cost of a wired communication transmission path between the first communication node and the sending node and a communication cost of a wireless communication transmission path between the first communication node and the sending node to obtain an evaluation result on communication cost difference includes:

evaluating, based on signal-to-noise ratio, route hops and modulation mode, the difference between the communication cost of the wired communication transmission path between the first communication node and the sending node and the communication cost of the wireless communication transmission path between the first communication node and the sending node, to obtain the evaluation result on communication cost difference.

In an embodiment, the method further includes:

broadcasting, if a communication transmission path between the first communication node and a second communication node fails, information about the failed communication transmission path to other communication node in the target communication network.

To solve the above technical problems, an apparatus for controlling dual-mode communication is further provided in the present disclosure. The apparatus includes:

an initial registration unit, configured to establish a communication connection with at least one target communication node in a target communication network by a wired communication protocol, to obtain a wired communication data packet;

an extraction unit, configured to extract wireless communication configuration information pre-stored in the wired communication data packet; and a wireless registration unit, configured to configure a wireless communication port based on the wireless communication configuration information.

To solve the above technical problems, a device for controlling dual-mode communication is further provided in the present disclosure. The device includes:

a memory, configured to store instructions for implementing steps of the method for controlling dual-mode communication described above; and a processor, configured to execute the instructions.

To solve the above technical problems, a computer readable storage medium is further provided in the present disclosure. The computer readable storage medium stores a computer program, in which the computer program, when executed by a processor, implements steps of the method for controlling dual-mode communication described above.

In the method for controlling the dual-mode communication according to the present disclosure, the first communication node to be added to the target communication network firstly establishes a communication connection with at least one target communication node in the target communication network by a wired communication protocol, thus to receive a wired communication data packet sent by the target communication node, and then extracts wireless communication configuration information pre-stored in the wired communication data packet, thus to configure the wireless communication port based on the wireless communication configuration information. With the method for controlling dual-mode communication according to the present disclosure, it is unnecessary for the wireless communication node which is newly added to the network to find out the channel for transmitting the pilot beacon by the central coordinator (or the data concentrator), wait for performing the handshake protocol with the central coordinator (or the data concentrator) and determine the wireless channel for exchanging information, but the communication node after being added to the target communication network is only required to configure the wireless communication port based on the wireless communication configuration information in the wired communication data packet received on a wired communication transmission path, thereby accelerating the registration progress of the wireless communication node accessing to the network and saving the registration time in a dual-mode communication network.

The apparatus and device for controlling dual-mode communication, and the computer readable storage medium according to the present disclosure also have the above beneficial effects, which will not be repeated herein.

BRIEF DESCRIPTION OF THE DRAWINGS

The drawings to be used in the description of the embodiments or the conventional technology will be described briefly as follows, so that the technical solutions according to the embodiments of the present disclosure or according to the conventional technology will become clearer. It is apparent that the drawings in the following description only illustrate some embodiments of the present disclosure, and other drawings may also be obtained by those skilled in the art according to these drawings without any creative work.

DETAILED DESCRIPTION

The core of the present disclosure is to provide a method, apparatus and device for controlling dual-mode communication, and a computer readable storage medium. Compared with the conventional technology, the technical solution provided by the present disclosure is capable to realize wireless communication configuration in dual-mode communication more quickly, thereby accelerating the registration progress of the wireless communication node accessing to the dual-mode communication network.

The following is a clear and complete description of the technical solutions of the embodiments in the present disclosure with reference to the accompanying drawings in the embodiments of the present disclosure. Apparently, the described embodiments are only some rather than all of the embodiments of the present disclosure. Based on the embodiments of the present disclosure, all other embodiments obtained by the skilled in the art without any creative effort fall within the scope of protection of the present disclosure.

Figure 1:
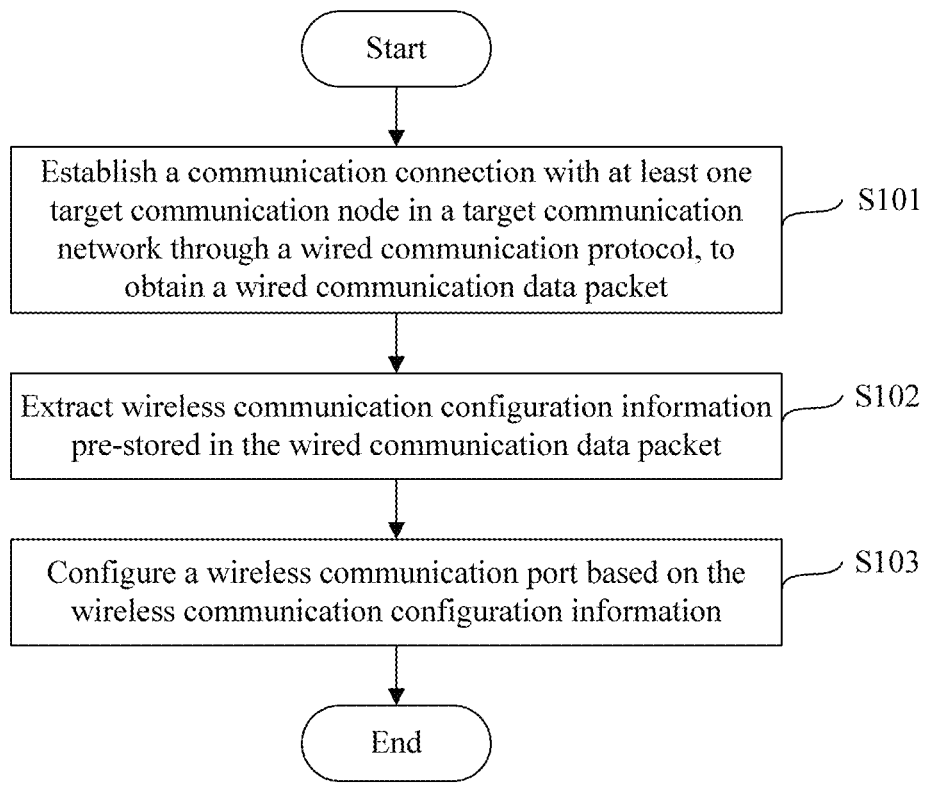
FIG. 1 is a flow chart of a method for controlling dual-mode communication according to an embodiment of the present disclosure.
Figures 2, 3:
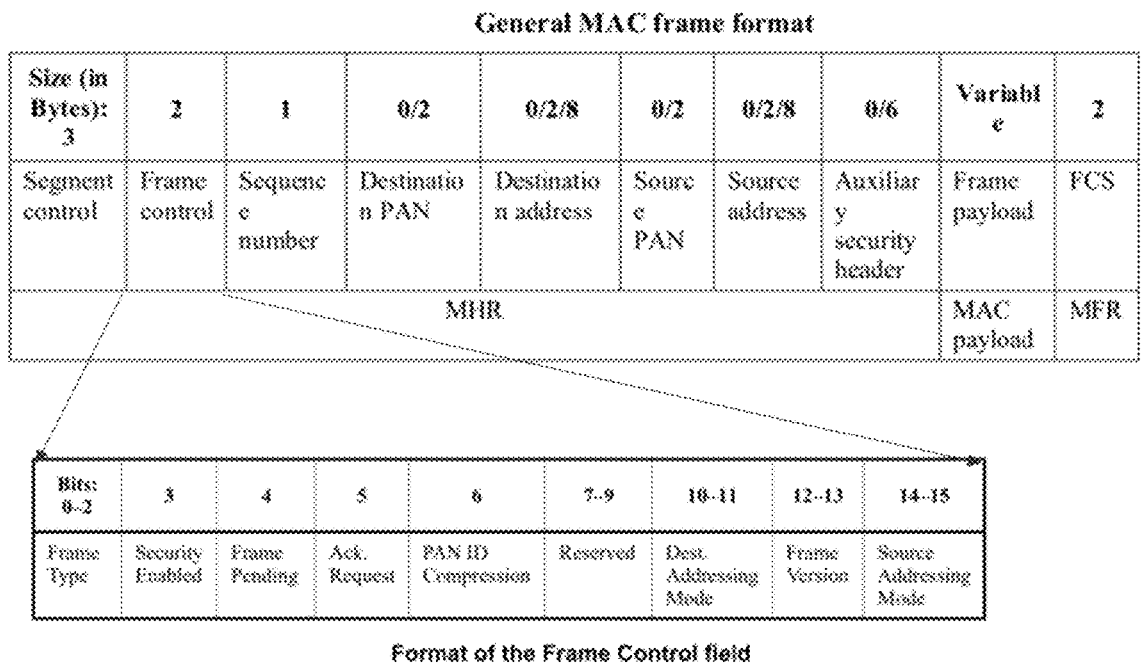
FIG. 2 is a schematic diagram of a wired communication data packet according to a first embodiment of the present disclosure.
FIG. 3 is a schematic diagram of a wired communication data packet according to a second embodiment of the present disclosure.
Figures 4, 5:
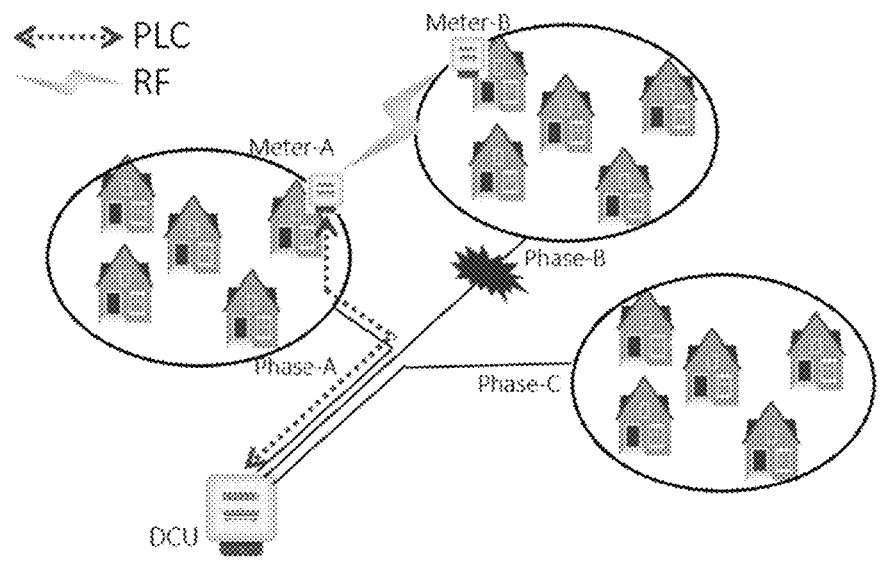
FIG. 4 is a schematic diagram of a wired communication data packet according to a third embodiment of the present disclosure.
FIG. 5 is a schematic diagram of a dual-mode route according to an embodiment of the present disclosure.

FIG. 1 is a flow chart of a method for controlling dual-mode communication according to an embodiment of the present disclosure. FIG. 2 is a schematic diagram of a wired communication data packet according to a first embodiment of the present disclosure. FIG. 3 is a schematic diagram of a wired communication data packet according to a second embodiment of the present disclosure. FIG. 4 is a schematic diagram of a wired communication data packet according to a third embodiment of the present disclosure.

As shown in FIG. 1, the method for controlling dual-mode communication according to the present disclosure, applied to a first communication node, includes the following steps S101 to S103.

In step S101, a communication connection with at least one target communication node in a target communication network is established by a wired communication protocol, to obtain a wired communication data packet.

Specifically, the first communication node having dual-mode communication capability may perform an initial network registration through the wired communication protocol, and may also establish a communication connection with a target communication node (usually a node adjacent to the first communication node) in the target communication network through the wired communication protocol. If the first communication node has difficulty in communicating with the central coordinator (or the data concentrator) for some reason when the first communication node wants to join the target communication network, and thus cannot complete the initial network registration. At this time, the first communication node may establish a communication connection through a wired communication data packet transmitted from the adjacent node.

If the target communication network to which the first communication node is added is a communication network of a smart grid, the wired communication protocol is a power line carrier communication protocol, and accordingly, the wired communication data packet is a power line carrier communication data packet.

G3-PLC communication standard is a global power line communication open protocol specially designed for a smart grid, and is a standard of a Narrow-Band Power Line Communications (NB-PLC) technology. The G3-PLC communication standard is applicable to a low-speed data communication scenario such as automatic meter reading, energy control and grid monitoring. A power line carrier communication route adopts the Lightweight On-demand Ad Hoc Distance-vector routing protocol-Next Generation, referred to as LOADng protocol. The LOADng protocol is a route protocol that is only enabled when needed, which means the LOADng protocol is a passive route protocol. That is, a route from a source host to a destination host is searched only when the source host needs to transmit data. If the route from the source host to the destination host has not been established, the source host adopting the LOADng protocol will broadcast a Route Request (RREQ) message in the entire target communication network, and a communication node receiving the message will update its stored information about the sending node and forward the message.

The process of an initial network registration based on the G3-PLC communication standard mainly includes the following steps. The first communication node sends a pilot beacon request and a registration request to a target communication node and other communication nodes which have completed network registration. The target communication node and other communication nodes feedback route information of the target communication node to the first communication node. The target communication node forwards the registration request of the first communication node to the central coordinator (or the data concentrator) in the target communication network, and transmits identity verification information and registration success information fed back by the central coordinator (or the data concentrator) to the first communication node. The first communication node completes the initial network registration.

In step S102, wireless communication configuration information pre-stored in the wired communication data packet is extracted.

The central coordinator (or the data concentrator) stores the wireless communication configuration information in the wired communication data packet, and transmits multiple wired communication data packets to all communication nodes in the local area network (that is, the target communication network). After completing the initial network registration, the first communication node receives the wired communication data packet sent from the central coordinator (or the data concentrator) or sent from an adjacent communication node. The wired communication data packet includes not only wired communication configuration information, but also wireless communication configuration information. The wireless communication configuration information may at least include a wireless communication channel and a wireless communication rate used in the target communication network. Based on the information, the first communication node may configure a wireless communication port, realizing a rapid configuration of the wireless communication port of the first communication node. Then, the first communication node may immediately perform reliable data or instruction transmission with other communication nodes in the target communication network.

In the smart grid, based on the G3-PLC communication standard, a media access control (MAC) header (MHR) is included in a front end of each wired communication data packet. The MHR contains detailed control information on the wired communication data packet. Therefore, in an embodiment, the storing the wireless communication configuration information in the wired communication data packet may specifically include: storing the wireless communication configuration information in a media access control header of the power line carrier communication data packet.

In practice, the target communication network may be a network supporting dual-mode communication or a network not supporting dual-mode communication. However, even if the target communication network is a network supporting dual-mode communication, for the cost reason, it may be not configured all communication nodes in the target communication network as devices supporting dual-mode communication. To avoid the first communication node failing to extract the wireless communication configuration information, it may be set a wireless communication function bit in the media access control header of the power line carrier communication data packet, to indicate whether the target communication network supports dual-mode communication. Thus before the step S102, the first communication node having dual-mode communication function determines whether the wireless communication function bit in the wired communication data packet are defined as supporting wireless communication. In response to a positive determination, the first communication node may proceed to the step S102 of extracting the wireless communication configuration information pre-stored in the wired communication data packet. Communication nodes not having the dual-mode communication function may access the network in an original way.

As shown in FIG. 2, the media access control header contains a sequence number, a destination PAN, a destination address, and so on. There is a segment of reserved bits in Frame control in the media access control header, specifically, 7th to 9th bits in the lower table shown in FIG. 2. Therefore, in an embodiment, it may be defined the reserved bits in the Frame control in the media access control header as the wireless communication function bit. As shown in FIG. 3, the 7th bit may be selected as an indicator for indicting whether the wireless communication is supported. A value "0" of the bit indicates that the wireless communication is not supported, and a value "1" of the bit indicates that the wireless communication is supported.

In a case that the wireless communication is supported, as shown in FIG. 4, two bytes may be added at a back end of the media access control header to carry the wireless communication configuration information. A first byte of the two bytes carries wireless channel information, and a second byte of the two bytes carries wireless communication rate information.

Each central coordinator (or data concentrator) may, according to the method in the embodiment, store wireless communication configuration information in the media access control header of each of power line carrier communication data packets, and transmit the power line carrier communication data packets to all communication nodes in the target communication network where the central coordinator (or the data concentrator) is located. In the target communication network, for any devices supporting dual-mode communication, it is only required to extract the wireless communication configuration information in the media access control header of the power line carrier communication data packet, so as to quickly and correctly configure a wireless communication port. Then, the dual-mode communication devices in the target communication network where the central coordinator (or the data concentrator) is located may communicate with each other smoothly via wireless ports.

In step S103, the wireless communication port is configured based on the wireless communication configuration information.

The first communication node configures a wired communication port based on the wired communication configuration information in the wired communication data packet, and configures a wireless communication port based on the wireless communication configuration information in the wired communication data packet, thus realizing configuration of dual-mode communication.

Both the wired communication and the wireless communication may be affected by the environment. However, interference sources of the wired communication and the wireless communication have different physical characteristics. Under the dual-mode communication, the first communication node may switch to the wireless communication mode for communication in a case that the first communication node cannot communicate with a destination node or the communication quality is poor in wired communication mode; and similarly, the first communication node may switch to the wired communication mode for communication in a case that the first communication node cannot communicate with a destination node or the communication quality is poor in the wireless communication mode. The first communication node, regardless of serving as a source node, an intermediate node or a destination node, may dynamically select a communication mode, and apparently the first communication node has better communication stability than that of a communication device having a single communication mode.

Based on the above mechanism for quickly configuring the wireless communication port, the time required for a central coordinator (or a data concentrator) and multiple wired-plus-wireless (such as power line carrier communication plus wireless communication (PLC+RF)) dual-mode communication devices to construct a local area network is almost the same as the time required for the central coordinator (or the data concentrator) and wired communication (such as power line carrier communication (PLC)) single-mode communication devices to construct an identical local area network. If the first communication node has difficulty in communicating with the central coordinator (or the data concentrator) when the first communication node wants to join the target communication network, and thus cannot complete the initial network registration. At this time, the first communication node may configure the wireless communication port quickly based on the wired communication data packet transmitted from an adjacent node.

Consistent with the conventional technology, the central coordinator (or the data concentrator) according to the present disclosure still periodically sends a pilot beacon on a certain channel. Communication nodes in the target communication network may monitor the pilot beacon and calculate a period of an adjacent pilot beacon, thus to calibrate a local clock.

In the method for controlling dual-mode communication according to the embodiments of the present disclosure, the first communication node wanting to join the target communication network firstly establish a communication connection with at least one target communication node in the target communication network through a wired communication protocol, thus to receive a wired communication data packet sent by the target communication node, extracts wireless communication configuration information prestored in the wired communication data packet, and then configures a wireless communication port based on the wireless communication configuration information. With the method for controlling dual-mode communication according to the embodiments of the present disclosure, it is unnecessary for the newly added wireless communication node to find out the channel for transmitting the pilot beacon by the central coordinator (or the data concentrator), wait for performing the handshake protocol with the central coordinator (or the data concentrator) and determine the wireless channel for exchanging information, but the wireless communication node after being added to the target communication network is only required to configure the wireless communication port based on the wireless communication configuration information in the wired communication data packet received on a wired communication transmission path, thereby accelerating the registration progress of the wireless communication node accessing the network and saving the registration time in a dual-mode communication network.

Figure 6:
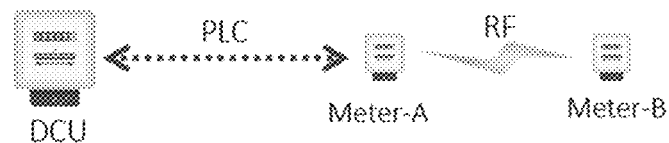
FIG. 6 is a schematic diagram of a dual-mode route according to another embodiment of the present disclosure.

FIG. 5 is a schematic diagram of a dual-mode route according to an embodiment of the present disclosure. FIG. 6 is a schematic diagram of a dual-mode route according to another embodiment of the present disclosure.

In order to achieve best communication performance, a preferred method for establishing a dual-mode route is to establish a wired communication route and a wireless communication route simultaneously, so that a best route may be selected from all routes according to the current environment based on a route algorithm.

For example, if the power line carrier communication link has a higher cost, a wireless communication link may be selected as a path for forwarding packets based on the route algorithm; and if the wireless communication link has a higher cost, the power line carrier communication link may be selected as a path for forwarding packets based on the route algorithm. As shown in FIG. 5, if a data collection unit (DCU) wants to read the meter Meter-B, but the power line communication (PLC) between the data collection unit (DCU) and the meter Meter-B fails or has poor communication quality, then the data collection unit (DCU) may first communicate with the meter Meter-A via a power line communication link, and then communicate with the meter Meter-B via a wireless communication transmission path (i.e., radio frequency link) between the meter Meter-A and the meter Meter-B. Finally, a dual-mode route is established as shown in FIG. 6.

In addition, different communication transmission paths may have different communication costs. A communication transmission path with a lowest communication cost may be selected for transmitting information based on the route algorithm. In the method for controlling dual-mode communication according to the embodiments of the present disclosure, after receiving a route request (RREQ) message sent by a sending node, the first communication node evaluates, based on a preset rule, a difference between the communication cost of the wired communication transmission path between the first communication node and the sending node and the communication cost of the wireless communication transmission path between the first communication node and the sending node, to obtain an evaluation result on communication cost difference. Then, the first communication node updates and forwards communication cost information about communication with the sending node based on the evaluation result on communication cost difference, so that a destination node of the sending node selects a communication transmission path with a lowest communication cost based on the evaluation result on communication cost difference.

Specifically, the first communication node may evaluate, based on signal-to-noise ratio, route hops and modulation mode (respectively corresponding to received signal quality, transmission delay and transmission rate), the difference between the communication cost of the wired communication transmission path between the first communication node and the sending node and the communication cost of the wireless communication transmission path between the first communication node and the sending node, to obtain the evaluation result on communication cost difference.

Route cost is accumulated by costs of links from a communication node to another communication node on the entire path. The destination node collects messages forwarded via different communication transmission paths, selects a communication transmission path with a lowest route cost by comparison, and feedbacks a route reply (RREP) message. The route reply message is transmitted to the source node via the selected communication transmission path. In this way, a route from the source node to the destination node is established.

In a smart grid, the dual-mode route is established by a route algorithm based on the LOADng protocol. In calculating the link cost, the cost of the wireless communication (RF) link is compared to the cost of the power line communication (PLC) link. Based on a comparison result, a route mechanism mixing power line communication (PLC) and wireless communication (RF) may be established. When establishing a route, a route request message is broadcasted at a power line communication (PLC) port, and the same route request message is also broadcasted at a wireless communication port. The intermediate node receiving the route request message evaluates the cost difference between the power line communication (PLC) link and the wireless communication (RF) link, updates its stored information about the link cost corresponding to the sending node, and forwards the message. The destination node collects route request (RREQ) messages transmitted via different power line communication transmission paths or wireless communication transmission paths, evaluates the link costs, and selects a communication transmission path with a lowest route cost to transmit a route reply (RREP) message.

Figure 7:
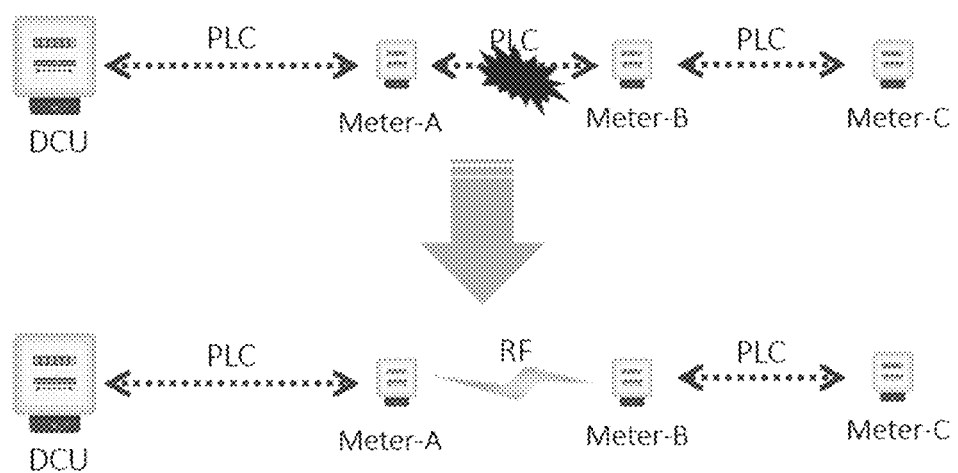
FIG. 7 is a schematic diagram showing a route repair process in dual-mode communication according to an embodiment of the present disclosure.

FIG. 7 is a schematic diagram showing a route repair process in dual-mode communication according to an embodiment of the present disclosure.

The originally established route may become unavailable due to changes of environment over time. In the smart grid, the LOADng mechanism does not proactively maintain the route state. Therefore, when a communication node cannot transmit data correctly or the original route information becomes invalid, the communication node will try to reestablish a route. Before the above process, the method for controlling dual-mode communication according to the embodiment of the present disclosure further includes: broadcasting by the first communication node, if a communication transmission path between the first communication node and a second communication node fails, information about the failed communication transmission path to other communication node in the target communication network.

The method for reestablishing a route is same as the method for establishing a new route. In the smart grid, when it is required to reestablish a route, the first communication node may broadcast the same route request message both at the power line communication port and at the wireless communication port, and establishes a route path capable of communicating with the destination node.

As shown in FIG. 7, it is assumed that when the data collection unit (DCU) reads the meter Meter-C, meter-reading information is forwarded via the meters Meter-A and Meter-B as intermediate nodes. If the power line communication (PLC) between the meter Meter-A and the meter Meter-B fails, the meter Meter-A may broadcast a route request message to reestablish a route.

Specifically, if the meter Meter-A finds that the wireless communication connection with the meter Meter-B is normal, the meter Meter-A and the meter Meter-B may transmit data via the wireless communication (RF) path, and the meter Meter-B and the meter Meter-C may still transmit data via the power line communication (PLC) path. If the meter Meter-A does not know whether the meter Meter-B supports wireless communication (RF), the meter Meter-A informs other communication nodes in the target communication network of information about the failure of the power line communication (PLC) path between the meter Meter-A and the meter Meter-B in a broadcast way, so that the meter Meter-A establishes a communication transmission path with the meter Meter-C via another communication node.

If the first communication node is an island node, the first communication node may firstly find a channel used by the pilot beacon with reference to the conventional technology (such as channel scanning), and then determine a wireless channel for exchanging information through the handshake protocol, thus realizing the configuration of the wireless communication port.

The embodiments of the method for controlling dual-mode communication are described above. Based on the above, an apparatus and a device for controlling dual-mode communication, and a computer readable storage medium, corresponding to the above method, are further provided in the present disclosure.

Figure 8:
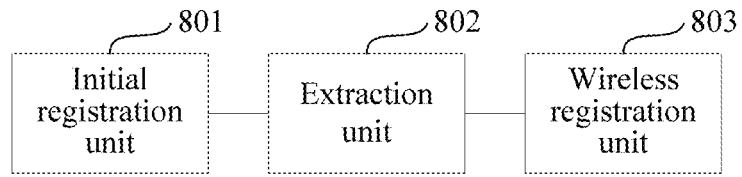
FIG. 8 is a schematic structural diagram of an apparatus for controlling dual-mode communication according to an embodiment of the present disclosure.

FIG. 8 is a schematic structural diagram of an apparatus for controlling dual-mode communication according to an embodiment of the present disclosure.

As shown in FIG. 8, the apparatus for controlling dual-mode communication according to the embodiment of the present disclosure includes: an initial registration unit 801, an extraction unit 802, and a wireless registration unit 803.

The initial registration unit 801 is configured to establish a communication connection with at least one target communication node in a target communication network through a wired communication protocol, to obtain a wired communication data packet.

The extraction unit 802 is configured to extract wireless communication configuration information pre-stored in the wired communication data packet.

The wireless registration unit 803 is configured to configure a wireless communication port based on the wireless communication configuration information.

Since the embodiments of the apparatus correspond to the embodiments of the method, the embodiments of the apparatus may refer to the embodiments of the method, which are not repeated herein.

Figure 9:
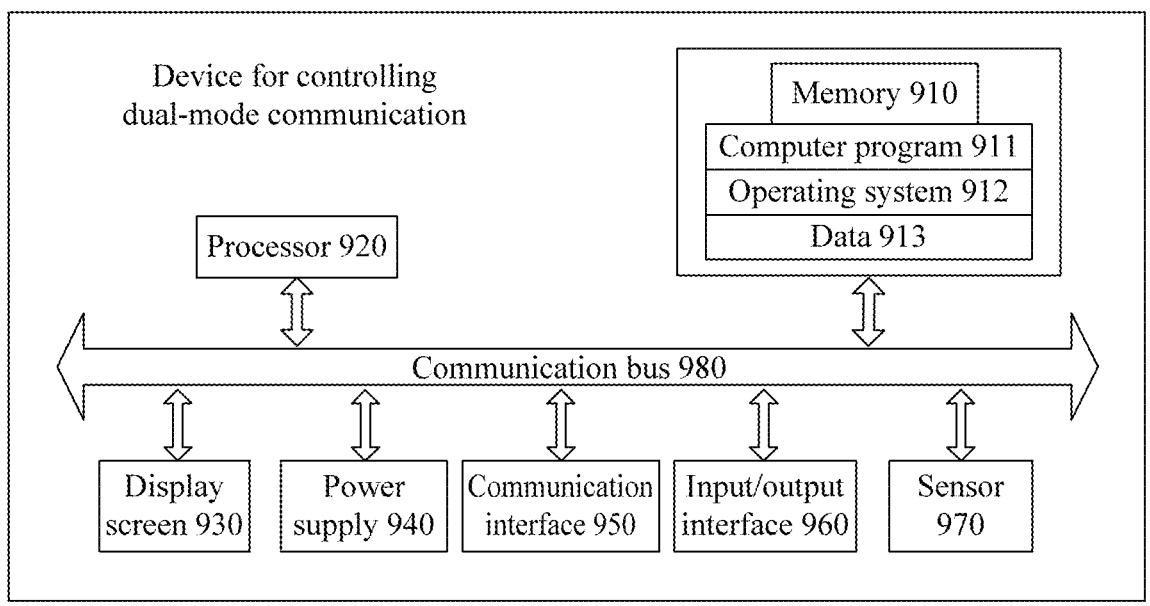
FIG. 9 is a schematic structural diagram of a device for controlling dual-mode communication according to an embodiment of the present disclosure.

FIG. 9 is a schematic structural diagram of a device for controlling dual-mode communication according to an embodiment of the present disclosure.

As shown in FIG. 9, the device for controlling dual-mode communication according to the embodiment of the present disclosure includes: a memory 910 and a processor 920.

The memory 910 is configured to store instructions for implementing steps of the method for controlling dual-mode communication according to any one of the embodiments described above.

The processor 920 is configured to execute the instructions.

The processor 920 may include one or more processing cores, such as a 3-core processor and an 8-core processor. The processor 920 may be implemented in at least one hardware form of a digital signal processing (DSP), a field programmable gate array (FPGA), and a programmable logic array (PLA). The processor 920 may include a main processor and a co-processor. The main processor is configured to process data in an awakened state, and is also called as a central processing unit (CPU). The co-processor is a low-power consumption processor for processing data in a standby state. In some embodiments, the processor 920 may be integrated with a graphics processing unit (GPU), and the GPU is responsible for rendering and drawing contents to be displayed on a display screen. In some embodiments, the processor 920 may further include an artificial intelligence (AI) processor configured to perform calculation operations related to machine learning.

The memory 910 may include one or more storage media, where the storage media may be non-transitory. The memory 910 may further include a high-speed random access memory and a non-volatile memory, such as one or more magnetic disks and flash memories. In the embodiment, the memory 910 is configured to store at least the following computer program 911. The computer program 911, when loaded and executed by the processor 920, is able to implement steps of the method for controlling dual-mode communication according to any one of the above embodiments. In addition, the memory 910 may further store an operating system 912 and data 913, and the storage mode may be temporary storage or permanent storage. The operating system 912 may be Windows. The data 913 may include, but is not limited to, the data involved in the above method.

In some embodiments, the device for controlling dual-mode communication may further include a display screen 930, a power supply 940, a communication interface 950, an input/output interface 960, a sensor 970, and a communication bus 980.

It should be understood by those skilled in the art that the structure shown in FIG. 9 does not intend to be a limitation on the device for controlling dual-mode communication, and more or fewer components may be included in the device for controlling dual-communication.

The device for controlling dual-mode communication according to the embodiment of the present disclosure includes the memory and the processor. The processor, when executing the program stored in the memory, performs the method for controlling dual-mode communication described above, achieving the same effects as the above.

It should be noted that the apparatus embodiments and the device embodiments described above are only illustrative. For example, modules are divided with regard to a logic function, and there may be other division manners in practice. For example, multiple modules or components may be combined or integrated into another system, or some features may be omitted or not implemented. In addition, the displayed or discussed mutual coupling or direct coupling or communication connection may be an indirect coupling or a communication connection through some interfaces, apparatuses or modules, and may be in an electrical form, a mechanical form or other form. The modules described as separate components may or may not be physically separated. The components displayed as modules may or may not be physical modules, that is, they may be located in one place or they may be distributed to multiple network modules. Some or all of the modules may be selected according to actual needs, to implement the solutions of the embodiments.

In addition, the functional modules in the embodiments of the present disclosure may be integrated in one processing module, or each of the modules may be taken separately as a module, or two or more of the modules may be integrated into one module. The above integrated module may be implemented either in hardware or in a software functional module.

The integrated module may be stored in a storage medium, if the integrated module is implemented in a software function module and is sold or used as a separate product. Base on such understanding, the technical solution of the present disclosure essentially or the part that contributes to the conventional technology or all or part of the technical solution may be embodied in the form of a software product. The computer software product is stored in a storage medium and is configured to perform all or part of steps of the method described in the above embodiments of the present disclosure.

To this end, a computer readable storage medium is further provided in an embodiment of the present disclosure. The computer readable storage medium stores a computer program. The computer program, when executed by a processor, implements steps of the method for controlling the dual-mode communication described above.

The computer readable storage medium includes a medium capable of storing program codes, such as a USB flash disk, a removable hard disk, a Read-Only Memory (ROM), a Random Access Memory (RAM), a magnetic disk and an optical disk.

The computer program stored in the computer readable storage medium according to the embodiment, when executed by a processor, is capable to implement steps of the method for controlling the dual-mode communication, thus achieving the same effects as the above.

The method, apparatus and device for controlling dual-mode communication, and the computer readable storage medium according to the present disclosure are described in detail above. The embodiments in the specification are described in a progressive manner. Each of the embodiments is mainly focused on its differences from other embodiments, and references may be made to each other for the same or similar parts. The apparatus, device and computer readable storage medium disclosed in the embodiments correspond to the method disclosed in the embodiment, and thus the description thereof is simple, and detailed description may be referred to the related description of the method. It should be noted that many improvements and modifications may be made to the present disclosure by those skilled in the art without departing from the principle of the present disclosure, and such improvements and modifications still fall within the scope of the protection of the present disclosure.

It should be further noted that the relational terms such as "first", "second" and the like are only used herein to distinguish one entity or operation from another entity or operation, rather than requiring or implying that the actual relationship or order exists between the entities or operations. Furthermore, terms of "include", "comprise" or any other variants are intended to be non-exclusive. Therefore, a process, method, article or device including a series of elements includes not only these elements but also other elements not explicitly listed, or further includes elements inherent for the process, method, article or device. Unless expressly limited otherwise, an element defined by a statement "comprising (including) a . . . " does not exclude other same element that may exist in the process, method, article or device including such element.

The invention claimed is:

1. A method for controlling dual-mode communication, applied to a first communication node, comprising:
    establishing a communication connection with at least one target communication node in a target communication network through a wired communication protocol, to obtain a wired communication data packet;
    extracting wireless communication configuration information pre-stored in the wired communication data packet; and
    configuring a wireless communication port based on the wireless communication configuration information.

2. The method according to claim 1, wherein the wireless communication configuration information comprises: a wireless communication channel and a wireless communication rate used in the target communication network.

3. The method according to claim 1, wherein the wired communication protocol is a power line carrier communication protocol, the wired communication data packet is a power line carrier communication data packet, and the wireless communication configuration information is stored in a media access control header of the power line carrier communication data packet.

4. The method according to claim 1, wherein before the extracting wireless communication configuration information pre-stored in the wired communication data packet, the method further comprises: determining whether a wireless communication function bit in the wired communication data packet is defined as supporting wireless communication; and proceeding to the step of extracting the wireless communication configuration information pre-stored in the wired communication data packet, in response to a positive determination.

5. The method according to claim 1, further comprising: after receiving a route request message sent by a sending node, evaluating, based on a preset rule, a difference between a communication cost of a wired communication transmission path between the first communication node and the sending node and a communication cost of a wireless communication transmission path between the first communication node and the sending node, to obtain an evaluation result on communication cost difference; and updating and forwarding communication cost information about communication with the sending node based on the evaluation result on communication cost difference, so that a destination node of the sending node selects a communication transmission path with a lowest communication cost based on the evaluation result on communication cost difference.

6. The method according to claim 5, wherein the evaluating, based on a preset rule, a difference between a communication cost of a wired communication transmission path between the first communication node and the sending node and a communication cost of a wireless communication transmission path between the first communication node and the sending node to obtain an evaluation result on communication cost difference comprises: evaluating, based on signal-to-noise ratio, route hops and modulation mode, the difference between the communication cost of the wired communication transmission path between the first communication node and the sending node and the communication cost of the wireless communication transmission path between the first communication node and the sending node to obtain the evaluation result on communication cost difference.

7. The method according to claim 1, further comprising: broadcasting, if a communication transmission path between the first communication node and a second communication node fails, information about the failed communication transmission path to other communication node in the target communication network.

8. An apparatus for controlling dual-mode communication, comprising:
an initial registration unit stored in memory, and configured to establish a communication connection with at least one target communication node in a target communication network through a wired communication protocol, to obtain a wired communication data packet;
an extraction unit stored in memory, and configured to extract wireless communication configuration information pre-stored in the wired communication data packet; and
a wireless registration unit stored in memory, and configured to configure a wireless communication port based on the wireless communication configuration information.

9. A device for controlling dual-mode communication, comprising: a memory, configured to store instructions for implementing steps of the method for controlling dual-mode communication according to claim 1; and a processor, configured to execute the instructions.

10. A non-transitory computer readable storage medium storing a computer program thereon, wherein the computer program, when executed by a processor, implements steps of the method for controlling dual-mode communication according to claim 1.

* * * * *